Oct. 23, 1923.
J. C. DETTRA
1,471,453
HEDGE TRIMMER
Filed July 30, 1921     2 Sheets-Sheet 1
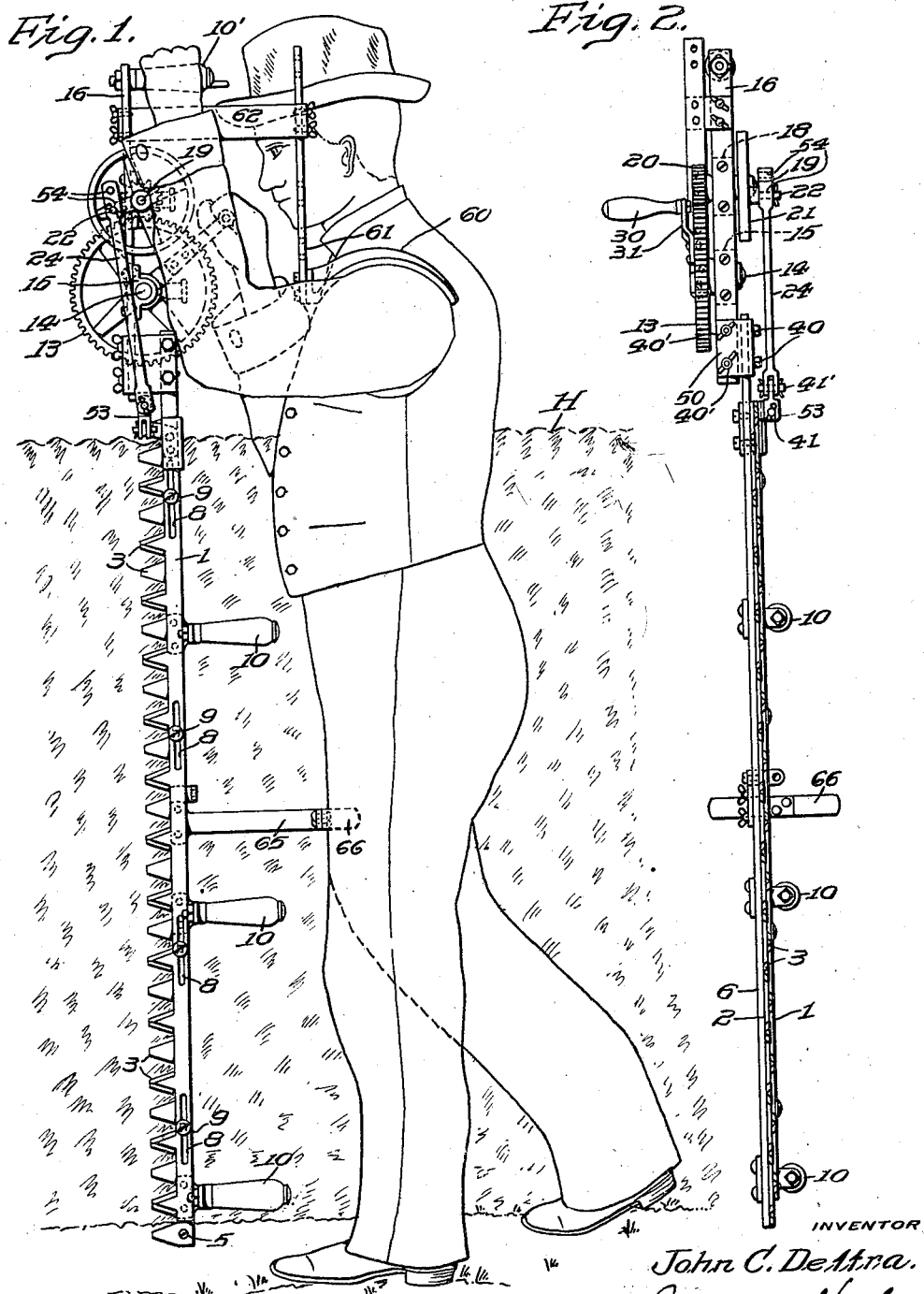
WITNESS
F. J. Hartman
INVENTOR
John C. Dettra.
BY
ATTORNEYS Oct. 23, 1923.
1,471,453
J. C. DETTRA
HEDGE TRIMMER
Filed July 30, 1921
2 Sheets-Sheet 2
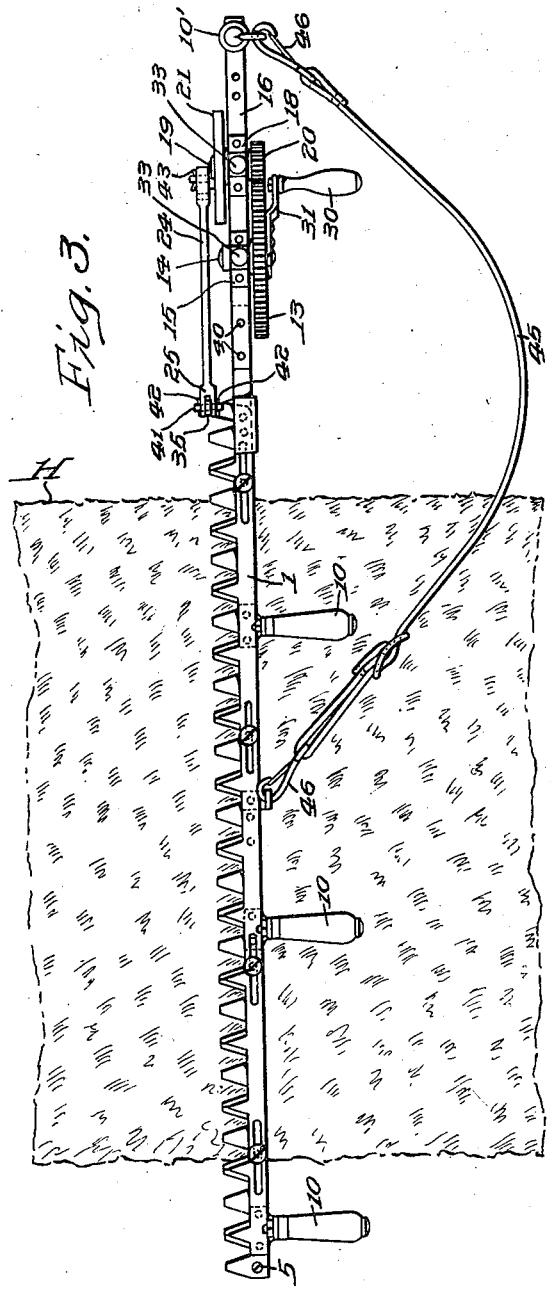
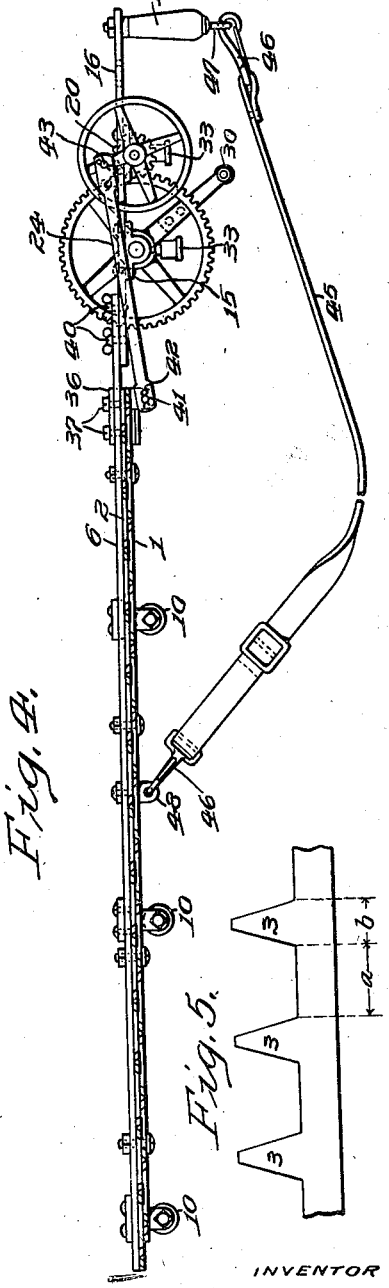
INVENTOR
John C. Dettra.
WITNESS
BY
ATTORNEYS Patented Oct. 23, 1923.

1,471,453

UNITED STATES PATENT OFFICE.

JOHN C. DETTRA, OF OAKS, PENNSYLVANIA.

HEDGE TRIMMER.

Application filed July 30, 1921. Serial No. 488,541.

*To all whom it may concern:*

Be it known that I, JOHN C. DETTRA, a citizen of the United States, and a resident of Oaks, county of Montgomery, and State of Pennsylvania, have invented certain new and useful Improvements in Hedge Trimmers, of which the following is a specification, reference being had to the accompanying drawing.
My invention relates to hedge trimmers intended for trimming privet and other hedges, a principal object of the invention being to provide a hedge trimmer of light yet sturdy construction which is adaptable for use in various positions, thereby enabling the trimmer to be utilized conveniently in trimming the sides, tops and other portions of a hedge.

Further objects of the invention are the provision in a hedge trimmer of the character aforesaid, of means whereby the actuating mechanism may be adjusted to various positions with respect to the relatively reciprocating cutting blades, thus enabling the operator by suitable adjustment of said mechanism to readily operate the trimmer in different positions required for the trimming of a hedge, the adjustment of the actuating mechanism referred to being effective to bring the operating handle, through the medium of which the power is supplied to cause relative reciprocation of the cutting blades, to positions suitable for maximum convenience of operation in accordance with the position in which the blades are to be maintained.

A still further object of the invention is to so proportion and design the teeth of the cutting blades so as to enhance the cutting power of the blades and enable the operator to trim off the branches or shoots of the hedge with a minimum expenditure of effort, so that the machine may be used in the trimming of hedges having relatively thick shoots or branches for a considerable period of time without undue fatigue.

The invention further comprehends the general simplification of machines of this general character and the design, construction and arrangement of the various parts thereof so as to produce a light and efficient machine which may be conveniently operated for the purpose intended and which is not liable to get out of order or be damaged in use.

The invention further includes all of the other various objects and novel features of construction and arrangement hereinafter more definitely specified and described.

In the accompanying drawing in which is shown a preferred embodiment of the invention, Fig. 1 is a side elevation thereof illustrating one method of utilizing the machine in trimming the side of a hedge, the hedge H being indicated in broken lines in said figure as lying between the observer and the machine. Fig. 2 is a front elevation of the machine shown in Fig. 1 the actuating mechanism in these figures being shown as adjusted to a position in which the operating handle is in a plane at right angles to the plane of the cutting blades thereby placing the machine in the most convenient condition for operation when the blades are to be maintained in a substantially vertical position as in trimming the sides of a hedge. Fig. 3 is a top plan view of the machine with the actuating mechanism adjusted to a position in which the operating handle is in a plane parallel with the plane of the cutting blades, thereby placing the machine in the most convenient condition for operation when the blades are to be maintained in a substantially horizontal position as in trimming top of a hedge H as indicated in said figure, and Fig. 4 is a front elevation of the machine adjusted as shown in Fig. 3. Fig. 5 is a fragmentary detail view of a portion of one of the cutting blades removed from the machine.

Referring more particularly to the form of the invention illustrated, the same comprises a pair of cutting blades 1 and 2 each having a longitudinally extending body portion and outwardly projecting substantially triangular teeth 3. The blade 2 is rigidly secured, as by screws 5, to a supporting bar 6 which extends under the body portion of the blade and projects for a suitable distance thereabove when viewed as in Figs. 1 and 2, this bar affording a rigid support for the relatively thin and more or less flexible blade to maintain the same in proper alignment. The blade 1 is arranged for relative reciprocation with respect to the blade 2 preferably by providing the former with a plurality of slots 8 through each of which extends a screw 9 having a large head overlying the edges of the slot, the end of the screw passing through the blade 2 and being rigidly seated in the supporting bar thereby holding the blades in sliding contact. Riveted or otherwise secured to the supporting bar are a plurality of handles 10 by means of which the operator is enabled to conveniently support and guide the blades under certain conditions of operation.

For effecting the reciprocation of the blade 1, suitable means are provided which may preferably comprise a relatively large gear wheel 13 supported on a shaft 14 rotatably mounted in a journal box 15 rigidly secured to a supporting member 16 preferably in the form of a flat bar. This member which is detachably supported from the bar 6 as hereinafter described, is also effective to support another journal box 18 in which is journaled a shaft 19, carrying on one end a pinion 20 meshing with the gear 13 and at the other end a small balance or fly wheel 21 to which is secured an outwardly projecting crank pin 22 cooperating with one end of a pitman 24, the other end of which carries a slotted or jaw-like cross head 25. An operating handle 30 is rotatably supported on a crank secured to the gear wheel 13, by means of which the gear train and balance wheel may be rotated to cause reciprocation of the pitman. Grease cups 33 are preferably provided to take care of the lubrication of the shafts.

The cutting blade 1 is provided at one end with a lug or ear 35 which extends outwardly from the body of the blade and is turned up near its end at right angles to the plane of the blade and drilled for the passage of a pivot pin, and for assisting in holding that portion of the blade adjacent the lug in contact with the other blade and in proper alignment, a channel-shaped guide 36 is preferably secured to the support 6 as by screws 37, to surround both blades and the support on three sides.

Under operative conditions the member 16 which carries the actuating mechanism is supported from that end of the supporting bar 6 which projects beyond the blades and means are provided for effecting a connection therebetween in such manner that the member may be operatively adjusted so as to bring the handle 30 into a plane parallel to the plane of the cutting blades or into a plane at right angles thereto so as to position the handle in the most convenient position for manipulation. More specifically, when it is desired to arrange the handle in a plane parallel to the plane of the cutting blades, as shown in Figs. 3 and 4, the end of the member 16 is connected directly to the projecting end of the supporting bar 6 conveniently by removable thumb screws 40, the parts being brought together with their widest faces in contact. Under these conditions the member 16, which may conveniently be provided with a handle 10' adjacent the extremity opposite that connected to the supporting bar 6, in effect forms a substantial continuation of the supporting bar, the relative position of the actuating mechanism and the lug 35 being such that the cross head 25 of the pitman may be connected directly to the lug by a pivot pin 41 removably maintained in position by cotter pins 42, a similar pin 43 serving to hold the other end of the pitman on the crank pin which latter is located at a proper distance from the center of the balance wheel 21 to give the desired stroke or reciprocation to the cutting blade 1 when the gears are rotated. With the parts adjusted in this manner, the machine may be conveniently employed in trimming the top of a hedge, as shown in Fig. 3, being preferably supported by a sling 45 having snap hooks 46 at its ends engaging respectively in an eye 47 at the end of the handle 10' and in an eye formed in a lug 48 secured to and about midway between the ends of the supporting bar 6. In use the sling is passed around the operator's neck and the machine steadied and guided by one of the handles 10 with the left hand while the right is used to rotate the operating handle 30.

When however it is desired to utilize the machine in an upright or substantially upright position as in trimming the side of a hedge, the sling is disengaged and the actuating mechanism so adjusted as to bring the operating handle into a plane at right angles to that of the blades. To effect this adjustment, a bracket 50 is employed which comprises an L-shaped plate formed with its flanges at right angles to each other and having spaced holes drilled near the outer edges thereof and arranged to register respectively with the holes in the projecting end of the supporting bar 6 and in the end of the member 16. Thus by securing one of the flanges to the end of the supporting bar by thumb screws 40 and the lower end of the member 16 to the other flange of the bracket, the supporting bar 6 and the member 16 may be operatively connected with their respective wider faces at right angles to each other, thus bringing the operating handle of the actuating mechanism into a plane normal to that of the cutting blade.

In order, however, to effect an operative connection under these conditions between the pitman and the lug 35 it is necessary to employ an auxiliary crosshead 53, or other equivalent means, having a pair of suitably drilled jaws which are adapted to receive and to be pivotally secured to the lug by the pivot pin 41 and a flange positioned at right angles to the jaws and adapted to extend into and be received between the jaws of the crosshead 25, a pivot pin 41' being utilized to effect an operative connection therebetween. It will be evident that the interposition of the auxiliary crosshead between the pitman and the lug would serve to substantially extend the effective length of the former and thus disturb the desired relation between the cutting blades in the absence of the provision of means for effecting a corresponding shortening of the pitman, and I therefore prefer to provide the end of the pitman opposite to that having the crosshead 25 with a pair of holes 54 each adapted for the reception of the crank pin, the distance between the centers of the holes corresponding to the distance between the centers of the pivot holes in the auxiliary crosshead 53, so that when the latter is employed the crank pin may be engaged in the lowermost hole of the pitman thus shortening its effective length by an amount equal to the elongation produced by the employment of the auxiliary crosshead.

For supporting the weight of the machine when utilized in a substantially upright position, I provide a curved shoulder rest 60 positioned on an upright 61 preferably near the lower end thereof, the upper end of the upright being removably attached to a brace 62 which extends to and is in turn removably attached adjacent the upper end of the member 16 as best shown in Fig. 1, the operative connection of these several members to each other being preferably effected through the medium of suitable thumb screws and plurality of holes for their passage being provided in the upright. Thus by relative adjustment of the several parts just described the shoulder rest may be brought to a position to comfortably rest on the shoulder of the operator to support the weight of the machine, which is held upright and to some extent guided through the medium of the handle 10″ and a leg rest 65 removably secured at a suitable point to the supporting bar 6 and carrying a curved yoke 66 adapted to rest against the operator's thigh.

In the construction of hedge cutting machines having relatively reciprocatory cutting blades it has hitherto been customary to arrange the teeth, which are ordinarily of substantially triangular form, in proximity to each other, the side edges of the respective teeth closely approaching the opposite edges of the adjacent teeth at the roots thereof so that the space between any two teeth is in the form of a pointed V. I have found, however, that by constructing the cutting blades with teeth rather widely separated instead of in close proximity to each other, that it is possible in a machine of this character to materially enhance the ability thereof to cut through the shoots or branches of the hedge with a considerably smaller expenditure of power than is possible where the teeth are set closely together, or, viewed in another aspect, to satisfactorily cut through considerably larger branches or shoots with a given expenditure of power. More specifically, and as best shown in Fig. 5, I prefer to space apart the teeth 3 at their roots for a distance at least equal to the width of the root of each tooth and I find that in practice good results are attained when the spacing between the teeth is increased to a distance nearly equal to twice the width of the root of each tooth, or, in other words, referring to Fig. 5, I prefer to make the distance $a$ substantially equal to the diameter of the circular path traversed by the crank pin 22 and at least equal to and preferably considerably greater than the distance $b$. By constructing the blades in this manner, I find in practice that as the machine is moved along the hedge the shoots or branches thereof are gathered in the spaces between the teeth during the time when the teeth on the respective blades are more or less in corresponding aligment and the pitman is either approaching or has just passed the limit of its stroke in either direction. However, as the reciprocating blade is moved so as to bring its teeth more and more out of alignment with the teeth on the stationary blade, it gathers speed as the speed of revolution of the crank pin increases and as the cutting edges of the teeth of the reciprocating blade gradually overlap the cutting edges of the corresponding teeth on the stationary blade, the shoots and branches are sheared off easily and cleanly and with a minimum expenditure of effort.

While I have described and illustrated herein with considerable particularity a preferred form of my invention I do not thereby desire or intend to limit myself to any precise details of construction and arrangement of the various parts as the same may be modified or varied in minor particulars from the precise embodiment disclosed as may be desired without departing from the spirit and scope of the invention as defined in the appended claims.

Having thus described my invention I claim and desire to protect by Letters Patent of the United States:

1. In a machine of the class described the combination with a bar and a pair of cutting blades one mounted for reciprocation longitudinally of the bar of a bracket detachably secured to the bar at one end, a member for detachable connection to the bracket or bar, meshing gears carried by the member, said member being adjustable relative to the bar to support the gears for rotation in a plane either parallel with or at right angles to the plane of cut by the blades, a pitman actuated by the gears, and means for connecting the pitman to one of the cutting blades when the gears are in either position relative to the blades.

2. In a device of the class described the combination with a bar, a cutting blade thereon, and a second blade mounted for reciprocation on the cutting blade, of meshing gears, a member constituting a support for the gears, an adjustable connection between said member and the bar for holding the gears for rotation in a plane either parallel with or at right angles to the plane of cut by the blades, means rotatable with the gears for actuating the same, a pitman actuated by the gears, means for connecting the pitman to the reciprocating blades when the gears are in either position relative to the blades, a brace adjustably connected to said means, an upright adjustably connected to the brace, and a shoulder rest extending from the upright, said rest and the gear operating means being positioned adjacent opposite sides respectively of the operator.

3. In a device of the class described the combination with a bar, a cutting blade thereon, and a second cutting blade mounted for reciprocation, of meshing gears, a crank arm for rotating the gears, a member supporting the gears, a detachable bracket engaging the said member and bar for holding the gears and the crank arm for rotation in planes parallel with the plane of cut by the blades, an ear upon the reciprocating blades, a pitman operated by the gears, and a universal connection between and detachably connected to the pitman and ear.

4. In a device of the class described the combination with a member, meshing gears thereon, and a crank arm for rotating the gears, of a pitman actuated by the gears, a cutting element actuated by the pitman, a handle upon said member, a brace adjustably connected to the member, an upright adjustably connected to the brace, and a shoulder rest extending from the upright, said upright and crank arm being spaced apart to extend close to opposite sides respectively of the operator.

In witness whereof, I have hereunto set my hand this 29th day of July, A. D. 1921.

JOHN C. DETTRA.